(12) United States Patent
Jin et al.

(10) Patent No.: US 6,922,219 B2
(45) Date of Patent: Jul. 26, 2005

(54) TRANSFLECTIVE LIQUID CRYSTAL DISPLAY

(75) Inventors: Hyun Suk Jin, Kyounggi-do (KR); Won Seok Kang, Seoul (KR)

(73) Assignee: LG. Philips LCD Co., Ltd., Seoul (KR)

( * ) Notice: Subject to any disclaimer, the term of this patent is extended or adjusted under 35 U.S.C. 154(b) by 2 days.

(21) Appl. No.: 10/639,454

(22) Filed: Aug. 13, 2003

(65) Prior Publication Data

US 2004/0032555 A1 Feb. 19, 2004

(30) Foreign Application Priority Data

Aug. 14, 2002 (KR) .............................. 10-2002-0048217
Jul. 9, 2003 (KR) ...................................... P2003-46482

(51) Int. Cl.[7] .......................................... G02F 1/1337
(52) U.S. Cl. ...................... 349/113; 349/114; 349/129; 349/130
(58) Field of Search .............................. 349/106, 107, 349/113, 114, 129, 132, 130

(56) References Cited

U.S. PATENT DOCUMENTS

| | | | | |
|---|---|---|---|---|
| 6,490,019 B2 | * | 12/2002 | Lee et al. | ................... 349/113 |
| 6,570,634 B2 | * | 5/2003 | Kim | ........................... 349/107 |
| 6,771,334 B2 | * | 8/2004 | Kubota et al. | .............. 349/106 |

* cited by examiner

Primary Examiner—Robert H. Kim
Assistant Examiner—Michael H Caley
(74) Attorney, Agent, or Firm—Morgan, Lewis & Bockius LLP

(57) ABSTRACT

A transflective liquid crystal display includes an upper substrate having an upper alignment film, a lower substrate having a reflective part for reflecting a light and a transmissive part where light transmits through the lower substrate, a liquid crystal positioned between the upper substrate and the lower substrate, a reflective part alignment film on the lower substrate corresponding to the reflective part and a transmissive part alignment film on the lower substrate corresponding to the transmissive part.

20 Claims, 8 Drawing Sheets

TRANSFLECTIVE LIQUID CRYSTAL DISPLAY

This application claims the benefit of the Korean Patent Applications No. 2002-48217 filed on Aug. 14, 2002 and No. 2003-46482 filed on Jul. 9, 2003, which are hereby incorporated by reference.

BACKGROUND OF THE INVENTION

1. Field of the Invention

The present invention relates to a liquid crystal display, and more particularly to a transflective liquid crystal display having an improved response time as well as a wide viewing angle.

2. Description of the Related Art

Generally, liquid crystal displays of active matrix driving scheme display a natural-like motion picture in use of a thin film transistor (hereinafter, referred to as TFT) as a switching device. The liquid crystal display (hereinafter, referred to as LCD) can be made smaller than a cathode ray tube CRT. Thus, an LCD can used in a portable television or in a monitor for a lap-top computer.

The liquid crystal display needs a separate light source because it is not self-luminous device. The liquid crystal display can be classified generally into a transmissive type or a reflective type device. The transmissive liquid crystal display has a backlight unit installed to face a rear substrate of two transparent substrates between which liquid crystals are injected, and incident light from the backlight is transmitted through the liquid crystal display to the display surface. The reflective liquid crystal display has a special surface formed on the rear substrate of two transparent substrates between which liquid crystals are injected, and reflects an external light incident upon the rear substrate that came through a display surface from an external light source, such as a separate auxiliary light. Recently, a transflective liquid crystal display has been suggested that uses both a backlight and external light incident upon the rear substrate that came through a display surface from an external light source.

FIG. 1 is a sectional diagram representing a transflective liquid crystal display of the related art. As shown in FIG. 1, the transflective liquid crystal display of the related art includes liquid crystals 20 injected between an upper plate 10 and a lower plate 30, upper/lower compensation films 14 and 42, an analyzer 16 installed on the upper compensation film 14, a polarizer 40 installed under the lower compensation film 42, and a backlight unit 50 located under the polarizer 40. The upper plate 10 also includes a dual color filter 8 (hereinafter, referred to as DCF), a common electrode 4 and an upper alignment film 6 that are sequentially formed on the upper substrate 12.

The DCF 8 is formed to be different in thickness at areas corresponding to a reflective part R and a transmissive part T of the transflective liquid crystal display. The light incident to the reflective part R passes through a color filter twice, and the light incident to the transmissive part T passes through the color filter once. Thus, the DCF 8 of the transmissive part T is made thicker than the DCF 8 of the reflective part R in order to reduce a color difference at the reflective part R and the transmissive part T. Accordingly, the DCF 8 of the transmissive T is twice as thick as the DCF 8 of the reflective part R.

The upper plate 10 further includes a common electrode 4 and an upper alignment film 6 that are sequentially formed on the upper substrate 12. A common voltage Vcom is applied to the common electrode 4 to control the movement of the liquid crystals 20. The upper alignment film 6 is completed by performing a rubbing process after spreading an alignment material such as polyimide on a common electrode 4.

FIG. 2 is a diagram representing a lower plate illustrated in FIG. 1 in detail. The lower plate 30 includes a TFT, a pixel electrode 34, a protective layer 36, a reflective plate 38 and a lower alignment film 44 formed on the lower substrate 32. The TFT includes a gate electrode connected to a gate line GL, a source electrode connected to the data line DL and a drain electrode connected to a pixel electrode 34 through a contact hole. Further, the TFT includes a gate insulating film to insulate the gate electrode, source and the drain electrodes and semiconductor layers to form a conductive channel between the source electrode and the drain electrode when a gate voltage is supplied to the gate electrode. The TFT selectively supplies a data signal from the data line to the pixel electrode 34 in response to a gate signal from the gate line. A voltage difference between data signal from the TFT and the common voltage Vcom from the common electrode 4 causes liquid crystals to rotate, and light transmittance is determined in accordance with the extent of rotation of the liquid crystals.

As shown in FIG. 2, the pixel electrode 34 is located at a cell area divided by the data line and the gate line and is made from a transparent conductive material with high light transmittance. The pixel electrode 34 is formed on the protective layer 36 spread on the entire surface of the lower substrate 32, and is electrically connected to the drain electrode through the contact hole formed on the protective layer 36. The lower alignment film 44 is formed by way of performing a rubbing process after spreading an alignment material on an upper part of the lower substrate 32 provided with the pixel electrode 34.

As shown in FIG. 1, the reflective plate 38 is formed at an area corresponding to the reflective part R to reflect incident light from the outside. The reflective plate 38 is made from AlNd metal. The backlight unit 50 is a light source that generates light to transmit the generated light toward the display surface corresponding to the transmissive part T. The external light incident to the reflective part R is reflected at the reflective plate 38 through the liquid crystal layer 20 and is radiated to outside through the liquid crystal layer 20. On the contrary, a visible ray generated at the backlight unit 50 installed within the liquid crystal display other than the external light is transmitted through the liquid crystal layer 20 to progress toward the display surface. Due to such a characteristic, a cell gap is made different in order to make an optical phase difference the same at the reflective part R and the transmissive part T. In other words, a cell gap d2 of the transmissive part T is made twice as wide as a cell gap d1 of the reflective part R, thereby making the optical phase difference the same.

The liquid crystals 20 injected between the upper plate 10 and the lower plate 30 are in an Electrical Controlled Birefringence ECB mode where the liquid crystal cells are aligned parallel to each of the alignment films 6 and 44 of the upper plate 10 and the lower plate 30, and move to be parallel to the direction of electric field when applying the electric field. If the external light is sufficient enough, the external light incident to the upper plate 10 is reflected by the reflective plate 38 of the reflective part R to progress toward the front surface, thereby implementing a picture. In addition or in the alternative, if the external light is not sufficient enough, the light generated from the backlight unit 50 is controlled by the arrangement of the liquid crystals 20 of the transmissive part T, thereby implementing a picture.

The transflective liquid crystal display has an advantage in that it can be used without depending on external lighting conditions, such as day or night, because a picture can be implemented using the external light and/or the backlight unit 50. However, a need arises to reduce the response time of liquid crystals such that the viewing angle can be made wider.

SUMMARY OF THE INVENTION

Accordingly, the present invention is directed to a transflective liquid crystal display that substantially obviates one or more of the problems due to limitations and disadvantages of the related art.

Accordingly, it is an object of the present invention to provide a transflective liquid crystal display having an improved improving response time as well as a wide viewing angle.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In order to achieve these and other objects of the invention, a transflective liquid crystal display includes an upper substrate having an upper alignment film, a lower substrate having a reflective part for reflecting a light and a transmissive part where light transmits through the lower substrate, a liquid crystal positioned between the upper substrate and the lower substrate, a reflective part alignment film on the lower substrate corresponding to the reflective part and a transmissive part alignment film on the lower substrate corresponding to the transmissive part.

In another aspect, a method of fabricating a transflective liquid crystal display includes the steps of forming an upper alignment film on an upper substrate, forming a reflective part alignment film corresponding to a reflective part of a lower substrate that reflects light, forming a transmissive part alignment film corresponding to a transmissive part of the lower substrate that transmits light therethrough and injecting liquid crystal in between the upper and lower substrates.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE PREFERRED EMBODIMENTS

Reference will now be made in detail to the preferred embodiments of the present invention, examples of which are illustrated in the accompanying drawings. Hereinafter, an embodiment of the present invention will be explained in full detail as referring to FIGS. 3 to 11.

Figure 1:
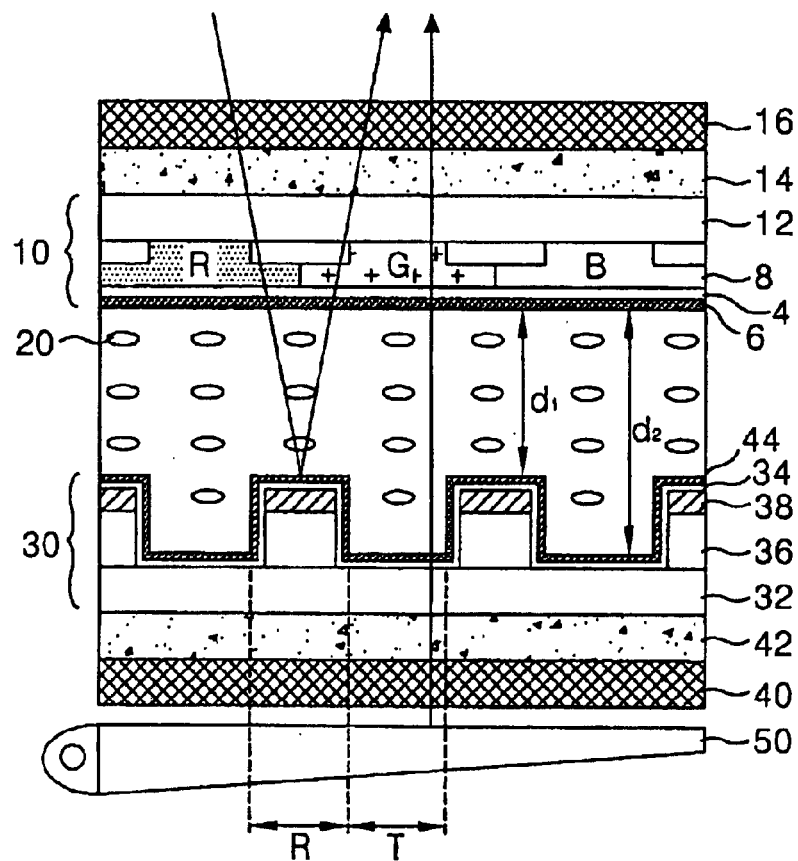
FIG. 1 is a sectional diagram representing a transflective liquid crystal display of the related art.
Figure 2:
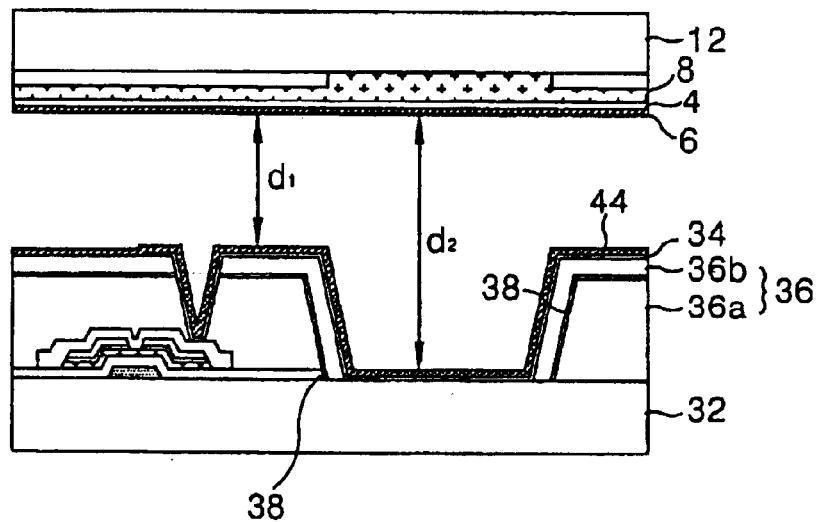
FIG. 2 is a diagram representing a lower plate illustrated in FIG. 1 in detail.
Figure 3:
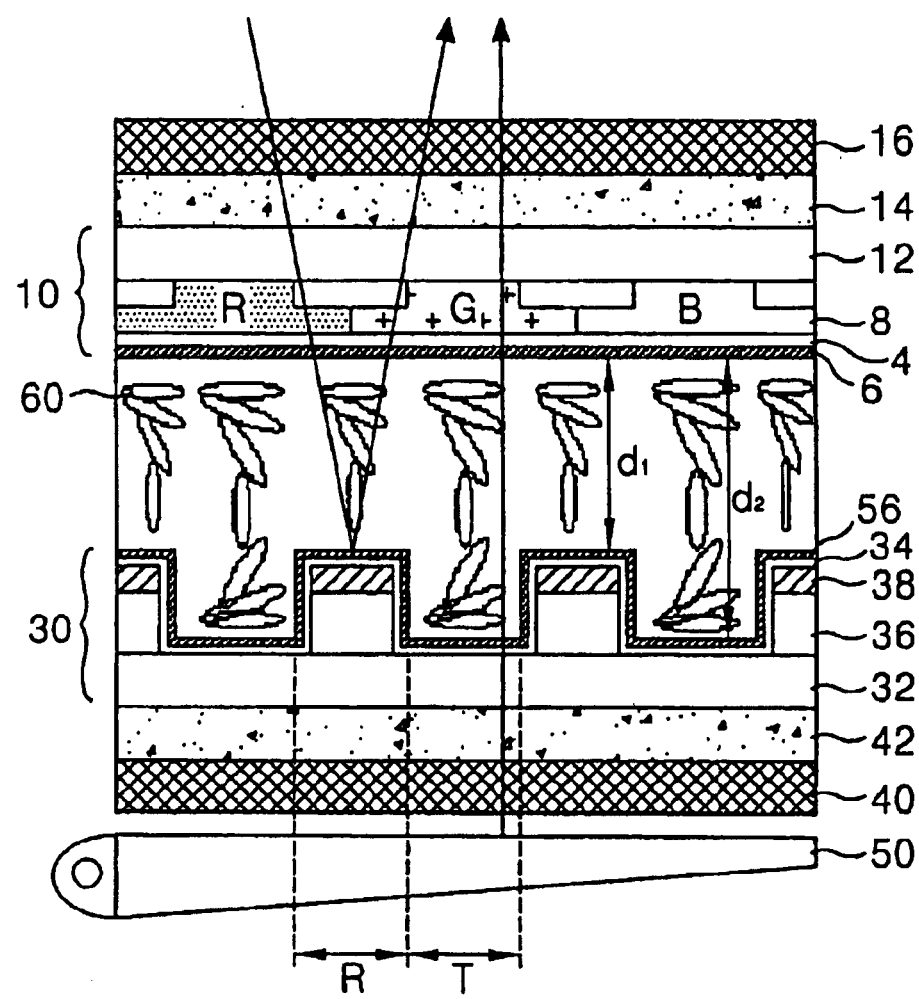
FIG. 3 is a sectional diagram representing a transflective liquid crystal display according to an embodiment of the present invention.
Figure 4:
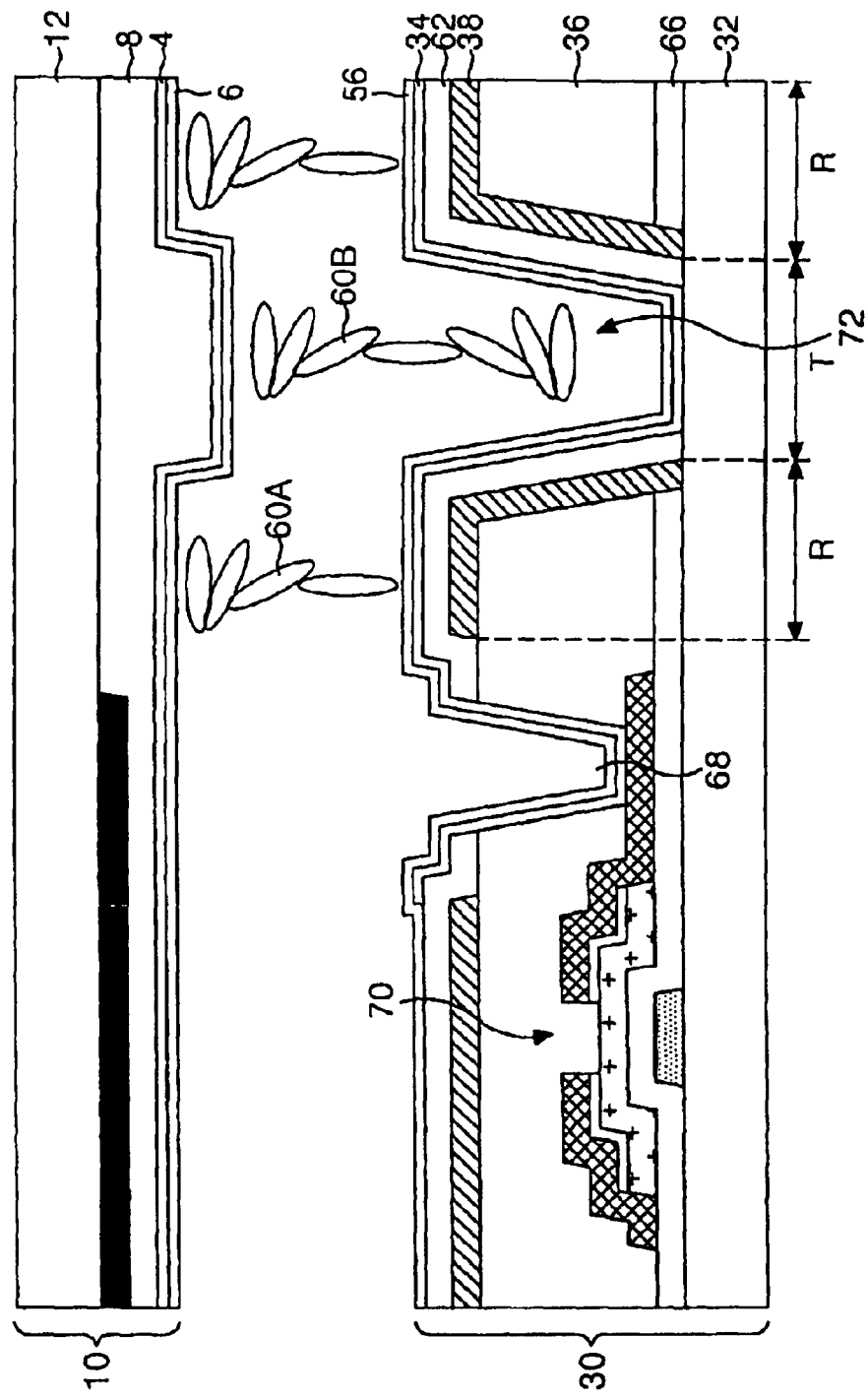
FIG. 4 is a diagram representing a lower plate shown in FIG. 3 in detail.

FIG. 3 is a sectional diagram representing a transflective liquid crystal display according to a first embodiment of the present invention. FIG. 4 is a diagram representing a lower plate shown in FIG. 3 in detail. As shown in FIGS. 3 and 4, the transflective liquid crystal display according to the present embodiment is driven in Optically Compensated Bend mode (hereinafter, referred to as OCB mode) at a transmissive part T, and in hybrid mode (hereinafter, referred to as R-OCB mode) at a reflective part R. To this end, an upper alignment film 6 formed on an upper plate 10 is made to have the same alignment properties on both the transmissive part T and the reflective part R, but a lower alignment film 56 formed on a lower plate 30 is made to have the alignment direction on the transmissive part T different from the alignment direction on the reflective part R. In other words, the upper alignment film 6 is processed for horizontally alignment, the lower alignment film 56 on the transmissive part T is processed for horizontal alignment, and the lower alignment film 56 on the reflective part R is processed for vertical alignment. The upper/lower part alignment films 6 and 56 of the transmissive part T have the same alignment direction. Thus liquid crystals 60 injected between the upper plate 10 and the lower plate 30 form a splay structure. On the other hand, the upper/lower part alignment films 6 and 56 of the reflective part R have different alignment directions, thus the liquid crystals 60 form a hybrid structure.

The liquid crystal display as shown in FIGS. 3 and 4 includes an upper plate 10 having a DCF 8, a common electrode 4 and an upper alignment film 6, which are sequentially deposited on an upper substrate 12; and a lower plate 30 having a TFT array, a protective layer 36, a reflective plate 38, a pixel electrode 34 and a lower alignment film 56, which are formed on a lower substrate 34. In addition, liquid crystals 60 are injected between the upper plate 10 and the lower plate 30. Further, upper/lower part compensation films 14 and 42 are installed on the exterior of the upper plate 10 and the lower plate 30 with an analyzer 16 installed on the upper compensation film 14 and a polarizer 40 installed under the lower compensation film 42. Furthermore, a backlight unit 50 is positioned under the polarizer 40.

The transmissive electrode 34 of the lower plate 30 on the lower substrate is formed with a transparent conducting material having a high transmitance. A second protection film 62 is formed on the lower substrate 32 and is connected to the drain electrode of the TFT 70 through the contact hole 68 that penetrates the first and the second protection films 36 and 62. The transmitting electrode 34 is formed on the lower substrate 32 and is exposed through the penetrating hole 72 penetrating the second protection film 62 to define the transmissive part (T). The transmissive electrode 34 serves to transmit the light from the backlight unit for displaying pictures. The reflective plate 38 is formed on the first protection film 36 which is an organic insulation material employed to protect the TFT 70 to define the refletive part (R). The reflective plate 38 serves to reflect the incident light from the outside to display the pictures.

A description of the components for the transflective liquid crystal display, except for distinctive parts in accordance with embodiments of the present invention has been in the previous discussion with regard to the related art. Thus, a detailed description will be omitted for components that have already been described.

Figure 5:
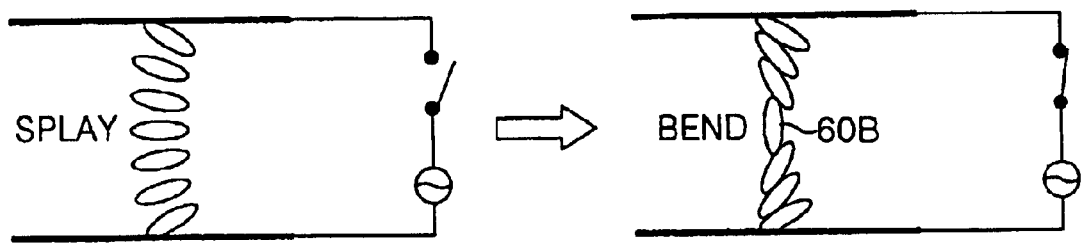
FIG. 5 is a diagram representing a transflective OCB mode liquid crystal cell.

FIG. 5 is a diagram representing a transflective OCB mode liquid crystal cell. The upper/lower part alignment films 6 and 56 are processed for parallel alignment, as shown in FIG. 5, so that liquid crystals 60B formed at the transmissive part T are maintained in a splay state, which is an initial alignment state. In other words, liquid crystal molecules are arranged at tilt angles of θ and –θ° in the surface of the upper/lower alignment film, and as it is closer to the center of the liquid crystal cell, the tilt angle decreases and the tile angle is 0° at the center of the liquid crystal cell. The liquid crystal molecules in such a splay state are changed into a bend state if a voltage more than a transition voltage Vtr is applied. The tilt angle of the liquid crystal molecules in the bend state is an initial pre-tilt angle of ±θ (at this moment, θ is normally 5~15°) at the surface of the upper/lower alignment film, and as it is closer to the center of the liquid crystal cell, the tilt angle increases and the tile angle is 90° at the center of the liquid crystal cell.

Figure 6:
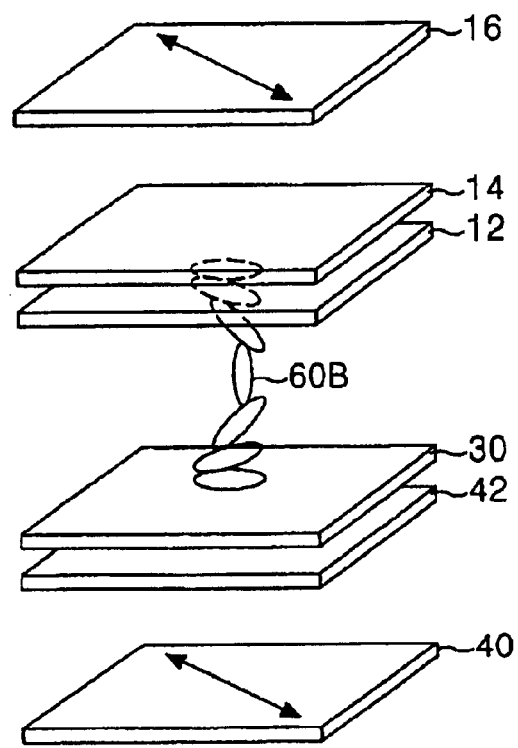
FIG. 6 is a diagram representing the operation principle of the OCB mode liquid crystal cell shown in FIG. 5.
Figure 7:
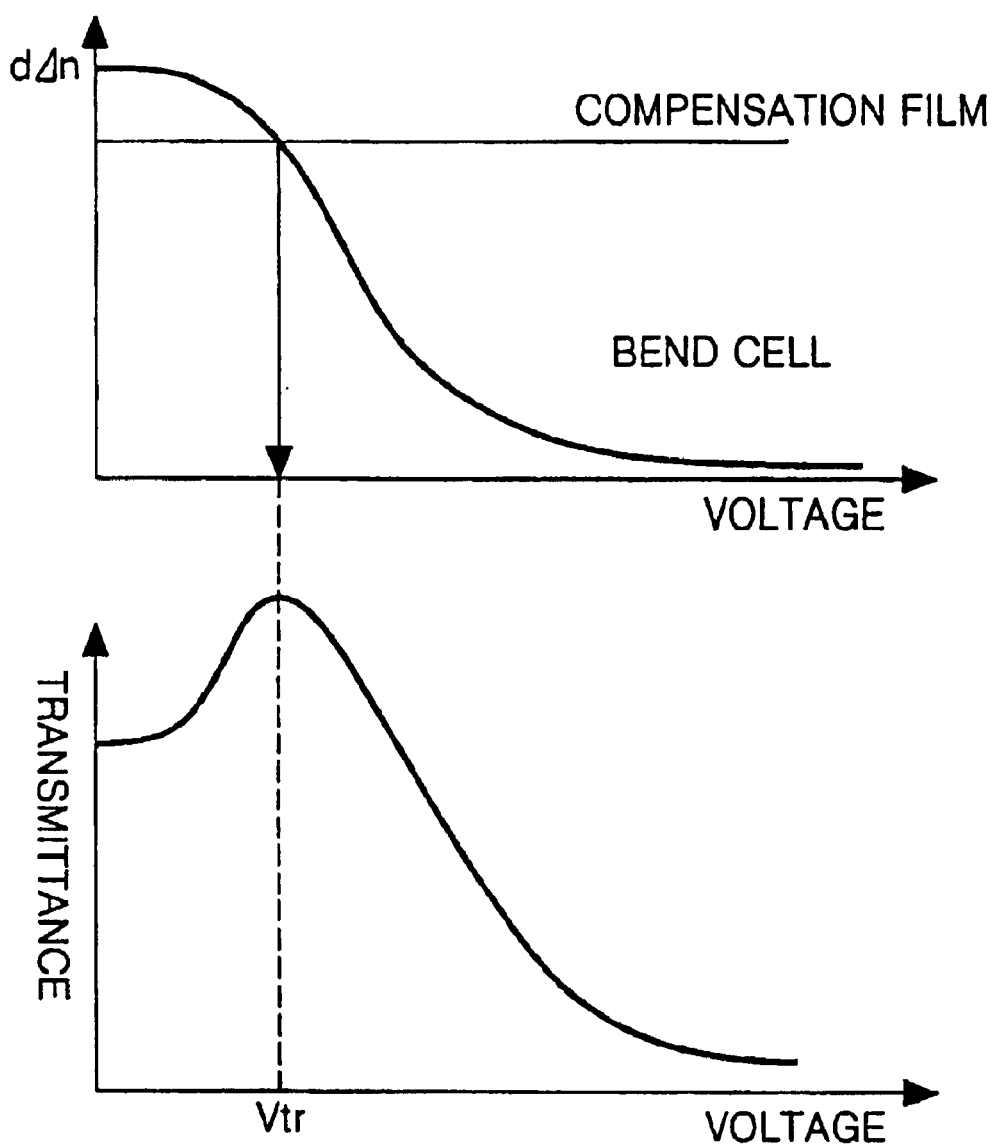
FIG. 7 is a graph representing phase difference and transmittance in accordance with the voltage applied to the OCB mode liquid crystal cell shown in FIG. 5.

FIG. 6 is a diagram representing the operation principle of the OCB mode liquid crystal cell shown in FIG. 5. FIG. 7 is a graph representing phase difference and transmittance in accordance with the voltage applied to the OCB mode liquid crystal cell shown in FIG. 5. Referring to FIGS. 6 and 7, there will be explained refractive index anisotropy for cell gap and transmittance in accordance with a voltage of an OCB mode liquid crystal cell.

As shown in FIG. 6, an electric field is applied to a liquid crystal cell while having transmissive axes of the polarizer 40 and the analyzer 16 parallel to each other. Liquid crystals 60B are changed from the splay state to the bend state on the basis of the transition voltage Vtr as the voltage becomes higher. As shown in FIG. 7, the optical retardation dΔn of the compensation film and the liquid crystals 60B becomes the same at a point of time corresponding to the transition voltage Vtr. In other words, if an electric field is applied to the liquid crystal cell, the optical retardation of the liquid crystals 60B is reduced and becomes equal to the retardation of the compensation film at a point.

The transmittance of the light through the analyzer 16 arranged parallel to the polarizer 40 becomes the best because the light through the polarizer 40 around this point passes through the liquid crystal layer and the compensation films 42 and 14 without changing its phase. Then, if an electric field is continuously applied to the liquid crystal cell, there occurs a phase difference in the OCB mode liquid crystals 60B and the compensation film. Accordingly, the transmittance of the light incident to the liquid crystal cell is reduced. At this moment, the light incident to the transmissive part T is generated from the backlight unit 50.

Figure 8:
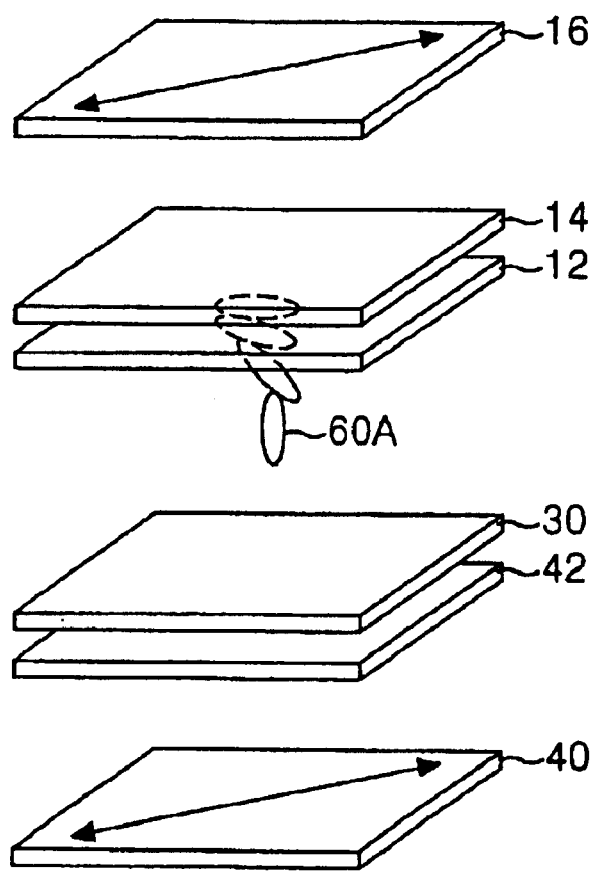
FIG. 8 is a diagram representing a reflective OCB mode liquid crystal cell.

FIG. 8 is a diagram representing a reflective R-OCB mode liquid crystal cell. The liquid crystals 60A formed at the reflective part R in the transflective liquid crystal display, as shown in FIG. 8, are aligned horizontally in the upper alignment film and vertically in the lower alignment film. If the external light is incident to the reflective part R, it goes through the liquid crystals 60A to be reflected at the reflective plate installed at the lower part, and progresses toward the display surface once more through the liquid crystals 60A.

Accordingly, external light goes through the liquid crystals 60A twice, thus the optical effect at the reflective part R is substantially the same as the optical effect at the transmissive part T. In other words, the reflective part R employing the liquid crystals 60A of hybrid mode can satisfy the graph as shown in FIG. 7, which represents transmittance in accordance with voltage at the transmissive part T employing the liquid crystals 60B with a bend structure. Thus, the cell gap in the transmissive part T is different from the reflective part R in order to make an optical path length the same. In other words, the cell gap d2 of the transmissive part T can be twice as wide as the cell gap d1 of the reflective part R, so that the optical path length is substantially the same.

The thickness of the DCF 8 is formed differently in the areas corresponding to the reflective part R and the transmissive part T because the incident light passes through the color filter twice at the reflective part R and once at the transmissive part T. Thus the DCF 8 of the transmissive part T can be twice as thick as the DCF 8 of the reflective part R in order to reduce color difference between the reflective part R and the transmissive part T.

In the transflective liquid crystal display according to the first embodiment of the present invention, the cell gap of the refelective part R is relatively narrower than that of the transmissive part T and thus the liquid crystal of the reflective part R responds relatively fast as compared with the transmissive part T. Therefore, when the liquid crystal display is operated in the reflection mode, since the backlight unit 50 is turned off, the effect is not applied to the operation of the transmissive T. However, when the liquid crystal display is operated in the transmissive mode, since there exists an external light, the liquid crystal corresponding to the reflective part R is driven and the transmission characteristic deterioratea.

Figure 9:
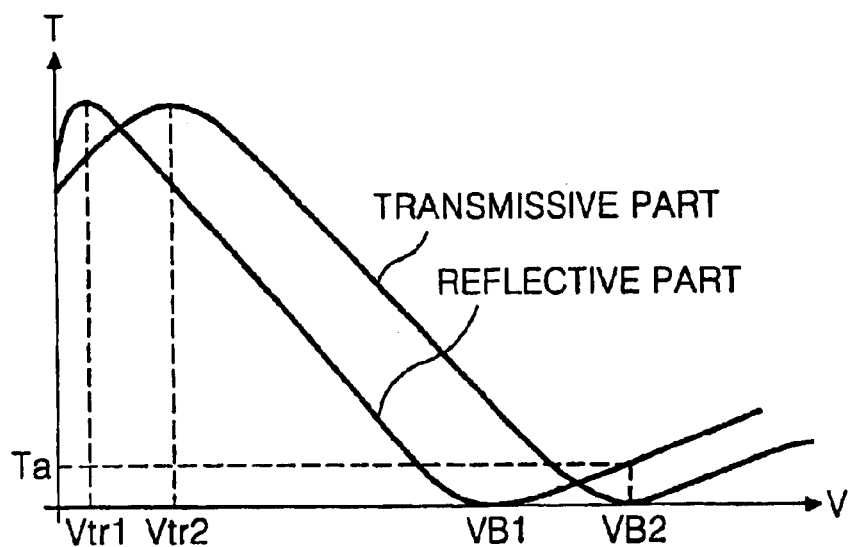
FIG. 9 is a graph illustrating a reflective and transmitting characteristics of a liquid crystal display shown in FIG. 3.

As shown in FIG. 9, when the liquid crystal display is operated in the transmissive mode, the voltage VB2 by which the liquid crystal material of the transmissive part T is transited to the black band state and the voltage VB1 by which having the liquid crystal of the reflective part R transited to the black band state are different. Thus, when the liquid crystal display is operated in the transmissive mode and the transmissive part embodies the black, a portion of light is transmitted by the external light in the reflective part R. Accordingly, the contrast ratio is reduced since the reflective is still improperly transmitting light.

Figure 10:
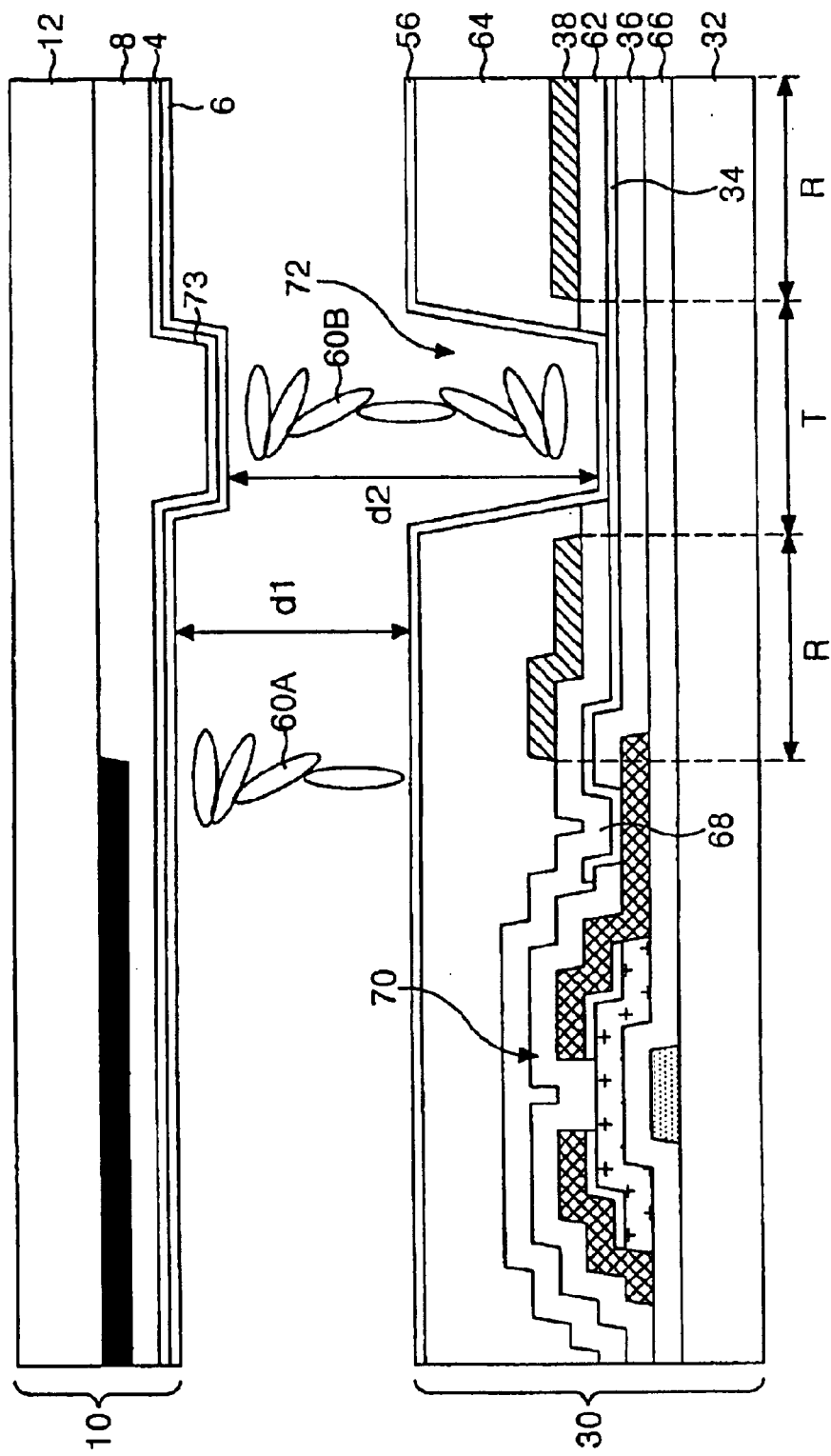
FIG. 10 is a cross sectional view illustrating a transflective liquid crystal display according to a second embodiment of the present invention.

FIG. 10 is a cross sectional view illustrating the transflective liquid crystal display according to a second embodiment of the present invention. As shown in FIG. 10, the transflective liquid crystal display according to the second embodiment of the present invention includes the same components except that the lower plate 30 includes a third protection film 64 formed on the reflective plate 38 and a protrusion 73 formed in the upper plate 10 as compared with the transflective liquid crystal display shown in FIGS. 3 and 4. As shown in FIG. 10, the lower plate 30 includes the TFT 70 covered by a first protection film 36, a transmissive electrode 34 in a transmissive part T corresponding to the protrusion 73 of the upper plate 10 and a reflective plate 38 in a reflective part R. Further, the lower plate 30 includes a second protection film 62 formed insulatively between the transmissive electrode 34 and the reflective plate 38. Furthermore, a third protection film 64 is formed on the reflective plate 38 in the lower plate 30. The third protection film 64 may be formed of an organic material, for example.

The transmissive electrode 34 is formed of a high-transmittance transparent conducting material on the first protection film 36. The transmissive electrode 34 is connected to the drain electrode of the TFT 70 through a contact hole in the first protection film 36. Further, the transmissive electrode 34 is exposed in the transmissive part T by a transmitting hole 72 penetrating the second and the third protection films 62 and 64. The transmissive electrode 34 allows the incident light from the backlight unit to transmit through such that a picture can be displayed.

The reflective plate 38 is formed on the second protection film 62 so as to cover the transmissive electrode 34 and to define the reflective part R. The reflective plate 38 makes the incident light from the outside reflect such that pictures can be displayed using the liquid crystal. The cell gaps of the transmissive part T and the reflective part R are formed such the ratio of the cell gaps can be controlled by the protrusion 73. More particularly, the cell gap d2 of the transmissive part T is twice as wide as the cell gap d1 in the reflective part R such that light traveling in the reflective part goes through the same thickness of liquid crystal as in the transmissive part. In other words, the protrusion 73 is formed in the upper substrate 10 corresponding to the transmiting hole 72 such that half of a first cell gap d2 in the transmissive part T is substantially equal to a second cell gap d2 in the reflective part R.

Figure 11:
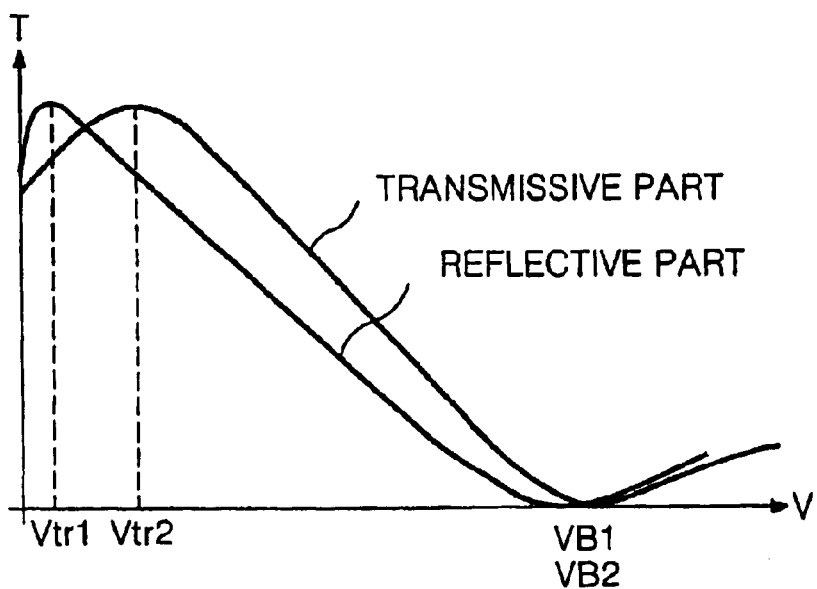
FIG. 11 is a graph illustrating a reflective and transmitting characteristics of a liquid crystal display shown in FIG. 10.

In the transflective liquid crystal display according to the second embodiment of the present invention, when a voltage is applied to the transmissive electrode 34, the voltage applied to the transmissive part T and the reflective part R has a difference due to the thickness and the dielectric constant of the third protection film 64, which is an organic insulating material. The liquid crystal of the reflective part R operates at a relatively low voltage. Meanwhile, the transmissive part T operates at a relatively higher voltage than the reflective part R of the transflective liquid crystal display according to the first embodiment of the present invention. That is, as shown in FIG. 11, the difference of the voltage vs. the transmittance characteristic of the transmissive part T and the reflective part R is decreased as compared to FIG. 9. Accordingly, when the transflective liquid crystal display according to the second embodiment of the present invention is operated in the transmissive mode, since the voltages VB1 and VB2 at which the liquid crystal material of the reflective part R and the transmissive part T is transited to the black band state are identical, reduction in the contrast ratio can be prevented.

The following method is preferably used in order to differently perform alignment process at the reflective part R driven by the R-OCB mode and the transmissive part T driven by the OCB mode of the liquid crystal panel according to the first and the second embodiments of the present invention. More particularly, this method can be used to create the alignment film having different directions in the reflective part R and the transmissive part T on the lower plate 30. First, the alignment film is positioned on the lower plate. Then the alignment film is exposed to an ultraviolet ray such that an amount of ultraviolet ray is different when irradiated on the upper alignment film or the lower alignment film corresponding to the reflective part R and the transmissive part T. Accordingly, the lower alignment film 56 formed at the reflective part R is vertically alignment-processed, and the liquid crystals corresponding to the transmissive part T are horizontally aligned. In another method, an ultraviolet ray is selectively irradiated on one of the upper alignment film or the lower alignment film corresponding to the reflective part R and the transmissive part T.

In still another method, a rubbing method can be used. After coating a first material, a horizontal alignment rubbing process is performed to create a horizontal alignment film. Then a second material is coated and a vertical alignment rubbing process is performed to create a vertical alignment film. The vertical alignment film is left at the reflective part R and the horizontal alignment film at the lower part is exposed by patterning the transmissive part T. Of course, the sequence of depositing the films can be reversed and the reflective part can be patterned.

In this way, if the OCB mode is used in the transflective liquid crystal display, the transflective liquid crystal display can have the rapid response time of liquid crystals as well as the wide viewing angle that is the advantage of the OCB mode. As described above, in the transflective liquid crystal display according to the present invention, the liquid crystals are driven in an OCB mode at the transmissive part T, and in a hybrid mode at the reflective part R. Accordingly, the transflective liquid crystal display of the present invention can have the wide viewing angle bcause of an improved response time as a result of using OCB mode.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A transflective liquid crystal display, comprising:
    an upper substrate having an upper alignment film;
    a lower substrate having a transmitting electrode;
    a reflection plate in a reflective part for reflecting a light and a transmissive part where light transmits through the lower substrate;
    a first protection film on the transmitting electrode separating the transmitting electrode from the reflection plate;
    a second protection film on the reflection plate;
    a liquid crystal positioned between the upper substrate and the lower substrate;
    a reflective part alignment film on the second protection film corresponding to the reflective part; and
    a transmissive part alignment film on the lower substrate corresponding to the transmissive part.

2. The transflective liquid crystal display according to claim 1, wherein the reflective part alignment film is aligned vertically and the transmissive part alignment film is aligned horizontally.

3. The transflective liquid crystal display according to claim 1, wherein the upper alignment film is aligned in the same direction as the transmissive part alignment film.

4. The transflective liquid crystal display according to claim 1, wherein the liquid crystal corresponding to the transmissive part has a OCB mode bend structure when a common electrode and a pixel electrode of the upper/lower substrates are supplied with a voltage above a transition voltage for the reflective part in R-OCB mode.

5. The transflective liquid crystal display according to claim 1, further comprising a first color filter formed twice as thick as a second color filter in a region corresponding to the reflective part in a region corresponding to the transmissive part and formed on the upper substrate.

6. The transflective liquid crystal display according to claim 1, further comprising a phase-difference film installed on the upper substrate.

7. The transflective liquid crystal display according to claim 1, further comprising a backlight unit installed at the lower part of the lower substrate for generating light through the transmissive part.

8. The transflective liquid crystal display according to claim 1,
wherein the second protection film is an inorganic protection film for covering the reflection plate, the inorganic protection film includes a transmitting hole, and further comprising
a transmitting electrode formed on the inorganic protection film corresponding to the transmissive part of the lower substrate.

9. The transflective liquid crystal display according to claim 1, further comprising:
a transmitting electrode formed in the the transmissive part,
the first protection film is an inorganic protection film for covering the transmitting electrode; and
the second protection film is an organic protection film for covering the reflection plate, wherein the organic protection film has a transmitting hole exposing the transmitting electrode in the transmissive part.

10. The transflective liquid crystal display according to claim 9, wherein voltages of the reflective part and the transmitting electrode for a black band state are identical.

11. The transflective liquid crystal display according to claim 9, wherein a protrusion is formed in the upper substrate corresponding to the transmitting hole such that half of a first cell gap in the transmissive part is substantially equal to a second cell gap in the reflective part.

12. A method of fabricating a transflective liquid crystal display, comprising the steps of:
forming an upper alignment film on an upper substrate;
forming a transmitting electrode on a lower substrate;
forming a first protection film on the transmitting electrode;
forming a reflection plate on the first protection film in a reflecting part that is electrically separated from the transmitting electrode;
forming a second protection film on the reflection plate;
forming a reflective part alignment film on the second protection film corresponding to a reflective part of the lower substrate that reflects light;
forming a transmissive part alignment film corresponding to a transmissive part of the lower substrate that transmits light therethrough; and
injecting liquid crystal in between the upper and lower substrates.

13. The method of fabricating the transflective liquid crystal display according to claim 12, wherein the step of forming a reflective part alignment film includes selectively radiating ultraviolet rays to an alignment film.

14. The method of fabricating the transflective liquid crystal display according to claim 12, wherein the step of forming a reflective part alignment film includes:
sequentially forming a horizontal alignment film and a vertical alignment film on the lower substrate; and
patterning a portion of vertical alignment film to expose the horizontal alignment film.

15. The method of fabricating the transflective liquid crystal display according to claim 12, wherein the reflective part alignment film is processed into vertical alignment and the transmissive part alignment film is processed into horizontal alignment.

16. The method of fabricating the transflective liquid crystal display according to claim 12, wherein the upper part alignment film is aligned is the same direction as the transmissive part alignment film.

17. The method of fabricating the transflective liquid crystal display according to claim 12, further comprising the step of forming a first color filter on the upper substrate to be twice as thick in a first region of the upper substrate corresponding to the transmissive part as compared to a second color filer in a second region of the upper substrate corresponding to the reflective.

18. The method of fabricating the transflective liquid crystal display according to claim 12, wherein a liquid crystal corresponding to the transmissive part has a band structure when a voltage above a transition voltage is applied to a common electrode and a transmissive electrode of the upper/lower substrate.

19. The method of fabricating the transflective liquid crystal display according to claim 12,
wherein the reflection plate overlaps the transmissive electrode.

20. The method of fabricating the transflective liquid crystal display according to claim 19, wherein the first protection film is an inorganic protection film for covering the transmitting electrode, and
the second protection film is an organic protection film for covering the reflection plate.

* * * * *